United States Patent
Popielas et al.

(10) Patent No.: US 6,701,775 B1
(45) Date of Patent: Mar. 9, 2004

(54) PRESSURE SENSOR APPARATUS FOR MEASURING PRESSURES INCLUDING KNOCK CONDITIONS IN ENGINE CYLINDERS

(75) Inventors: Frank W. Popielas, Naperville, IL (US); Howard M. Robins, Buffalo Grove, IL (US); Jeffery A. Foster, Rolling Meadows, IL (US); James S. Pietraski, Naperville, IL (US); Lawrence E. Peck, Wadsworth, IL (US)

(73) Assignee: Dana Corporation, Toledo, OH (US)

( * ) Notice: Subject to any disclaimer, the term of this patent is extended or adjusted under 35 U.S.C. 154(b) by 10 days.

(21) Appl. No.: 10/077,411

(22) Filed: Feb. 15, 2002

(51) Int. Cl.[7] .................................... G01L 23/22
(52) U.S. Cl. ........................ 73/35.12; 73/115
(58) Field of Search ................ 73/35.12, 35.09, 73/35.07, 115, 705, 715

(56) References Cited

U.S. PATENT DOCUMENTS

| | | | |
|---|---|---|---|
| 4,393,687 A | 7/1983 | Müller et al. | |
| 4,397,176 A | 8/1983 | Rohde et al. | |
| 4,686,861 A | 8/1987 | Morii | |
| 5,121,929 A | 6/1992 | Cobb | |
| 5,195,365 A | 3/1993 | Chujo et al. | |
| 5,230,238 A | 7/1993 | Takeuchi | |
| 5,301,001 A | 4/1994 | Murphy et al. | |
| 5,380,014 A | 1/1995 | Schäperkötter | |
| 5,659,132 A | 8/1997 | Novak et al. | |
| 6,003,872 A | 12/1999 | Nord | |
| 6,131,465 A | * 10/2000 | Wlodarczyk et al. | ...... 73/35.07 |
| 6,532,737 B1 | * 3/2003 | Kozerski et al. | .............. 60/323 |

* cited by examiner

*Primary Examiner*—John E. Chapman
(74) *Attorney, Agent, or Firm*—Rader, Fishman & Grauer, PLLC

(57) ABSTRACT

Sensor apparatus for a multiple layer steel (MLS) cylinder head gasket measures combustion pressures for detecting engine conditions. A membrane is positioned at one end of an elongated metal tube, and the membrane end of the tube engages a cylinder bore boundary. A fiber optical sensor apparatus is fixed within the tube, and communicates with cyclic combustion events via the membrane. In one disclosed embodiment, optical wires from sensor apparatus situated at each engine bore are bundled into a common groove machined into an extended spacer layer radially outwardly of the conventional boundary of the gasket. The tube protects the sensor apparatus from damage of sealing stress on the gasket, and particularly at the bore perimeter. Each tube lies in a separate groove in the spacer layer that terminates at the bore boundary. A converter changes optical signals received from the apparatus into electrical signals for transmittal to a controller.

12 Claims, 4 Drawing Sheets

PRESSURE SENSOR APPARATUS FOR MEASURING PRESSURES INCLUDING KNOCK CONDITIONS IN ENGINE CYLINDERS

BACKGROUND OF THE INVENTION

1. Field of Invention

The present invention relates generally to apparatus embedded in and or applied to gasket structures, and particularly to sensing apparatus applied to combustion gaskets of internal combustion engines. More specifically, the invention relates to pressure sensing apparatus provided within structures of MLS combustion gaskets for measuring pressure levels of combustion gases within the cylinder bores of internal combustion engines.

2. Description of the Prior Art

It is known to employ electronic sensors in gaskets for sealing between engine components including, for example, the block and cylinder head of a multi-cylinder internal combustion engine. In one case, the gasket comprises a sealing plate having several combustion chamber orifices, with combustion chamber sealing elements situated on the edges of the sealing plate surrounding the combustion chamber orifices. The gasket includes sensor elements for cylinder-specific detection of sealing movements perpendicular to the plane of the sealing plate, caused by pressure changes in respective combustion chambers being measured. All of the sensor elements are arranged outside of the combustion chamber sealing elements, and can be piezoelectric and piezoresistive, as well as glass fiber light guide-style sensors.

In another example, a gasket enclosed sensor system is employed for measurement of combustion chamber parameters and delivery of signals to points external of the engine. The gasket includes a combustion opening substantially surrounding a combustion chamber, and includes an access opening extending from the combustion chamber to a point external of the engine. A metallic sensor terminal is positioned within the access opening, and insulating material substantially surrounds the metallic sensor terminal.

In yet another example, a fluid sensor and associated circuitry are used to indicate presence of oil flow in a multi-cylinder internal combustion engine. The oil sensor includes a heating element positioned within the oil line, directly in the oil flow path. A comparator measures the value of signals from upstream and downstream heat sensors, and triggers a switching circuit when the temperature at the sensors approach one another to indicate an adequate oil flow to the engine.

In still another example, a gasket formed in the shape of an exhaust flange includes a load sensor comprising a pressure sensitive electrically resistive material positioned between electrodes and conductors extending outwardly of the perimeter of the gasket. A seal provided between first and second layers of the gasket, and about the load sensor, provides a seal for the electrodes, which are positioned in a cavity to protect the sensor from fluids.

SUMMARY OF THE INVENTION

A sensor for a multiple layer steel (MLS) cylinder head gasket aperture boundary is adapted to measure combustion pressures occurring in internal combustion engines for detection and control of engine knock, i.e. predetonation conditions, among other purposes. The structure of the sensor includes a pressure sensitive membrane at one end of a metal tube, wherein the tube is positioned adjacent a cylinder bore aperture boundary. The membrane is affixed to the tube at its aperture boundary end, and an optical sensor structure is fixed within the tube downstream of the membrane. The tube protects the optical sensor from becoming damaged under high sealing stresses that occur at the cylinder bore. As disclosed, the sensor is placed into a spacer layer of the MLS gasket, in a groove machined into the spacer layer, and an optical fiber wire coupled with a sensor from each cylinder bore is bundled into a common groove of the spacer layer. The groove may be located outside of the conventional component boundary of the gasket. Thus, the spacer layer may be extended radially outwardly of the conventional component perimeter at the convenience of the gasket designer. Finally, a converter is employed to change optical signals received from the optical wire into electrical signals for appropriate transmittal to a microprocessor of an engine control unit.

Where a plurality of cylinder bores is provided in the gasket, and to the extent that pressure sensing is provided at each bore, a real time quality engine management control opportunity based upon cylinder-by-cylinder measurement of combustion pressure is provided. The specific cylinder-to-cylinder data can be input into an engine control unit module that includes systems for optimization of engine performance parameters, including fuel economy and emissions levels, among others.

As the pressure sensor apparatus is designed to be applied to a protective tube positioned in a groove of a spacer layer, the apparatus may be positioned between beaded or active layers of a multiple-layered steel gasket without severe risk of being crushed or overstressed. Moreover, the sensor may be positioned relatively close to the flame front within the gasket structure, and as such can be particularly effective to measure pressure levels of cylinder-specific combustion gases in real time.

DETAILED DESCRIPTION OF THE PREFERRED EMBODIMENTS

Figure 1:
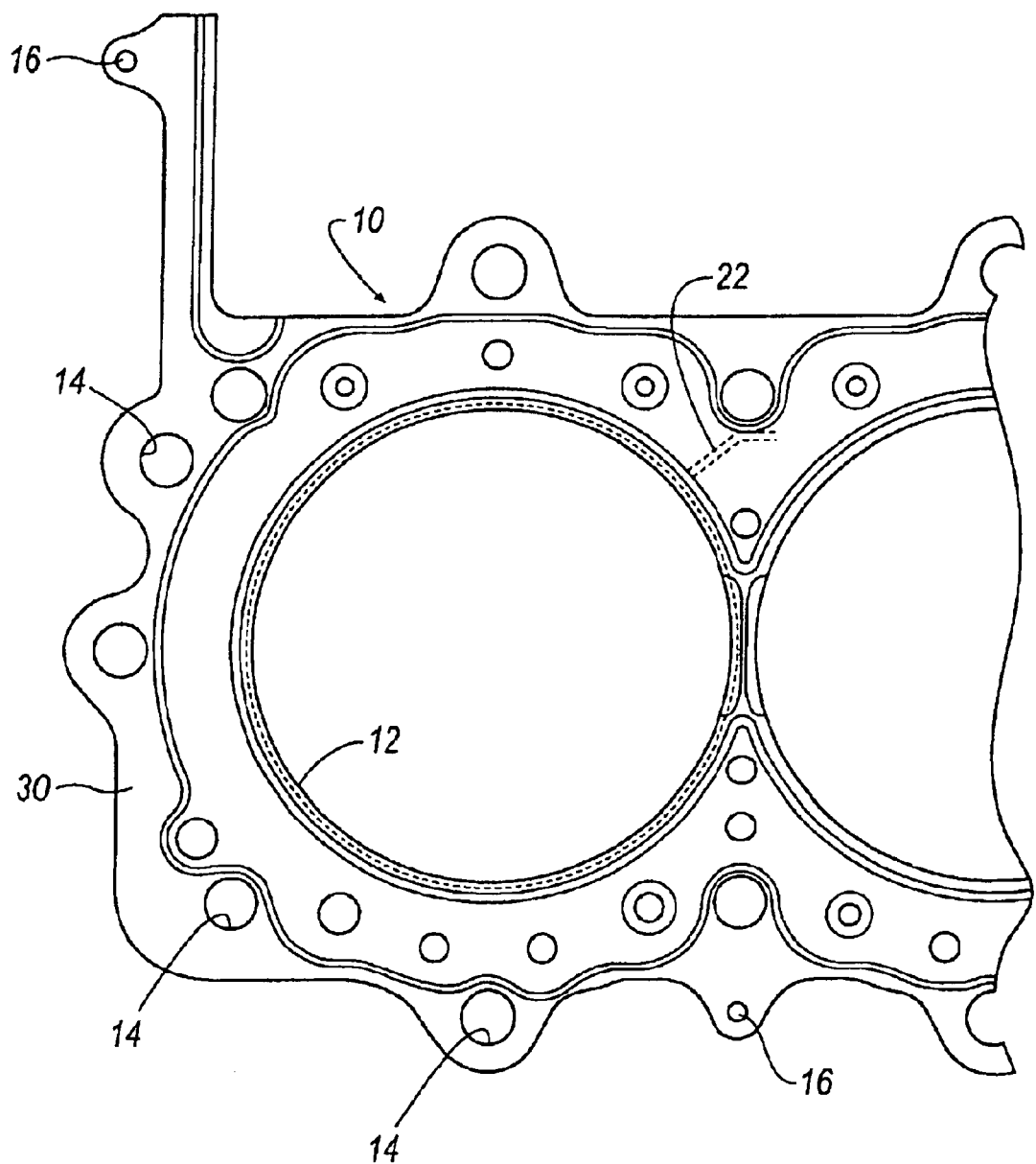
FIG. 1 is a fragmentary plan view of one described embodiment of a cylinder head gasket that incorporates the combustion pressure sensor system of the present invention, each sensor contained within a protective cylindrical metal tube disposed within a surface groove provided in a spacer layer of the gasket, and adapted to be positioned at the edge of an engine combustion aperture.

Referring initially to FIG. 1, one described embodiment of the pressure sensor apparatus of the present invention is herein described in detail. A combustion, or variously called cylinder head, gasket 10 is formed as a multiple layer steel (MLS) structure, and is of a type now commonly employed as combustion gaskets of internal combustion engines. The gasket 10 is shown only fragmentarily, and includes a plurality of combustion apertures 12, of which only one is shown and described herein. A plurality of bolt apertures 14, along with a plurality of other apertures not identified, appear about the periphery of the gasket as shown. Finally, a plurality of grommets 16 are positioned so as to hold the plurality of metal layers together.

Figure 2:
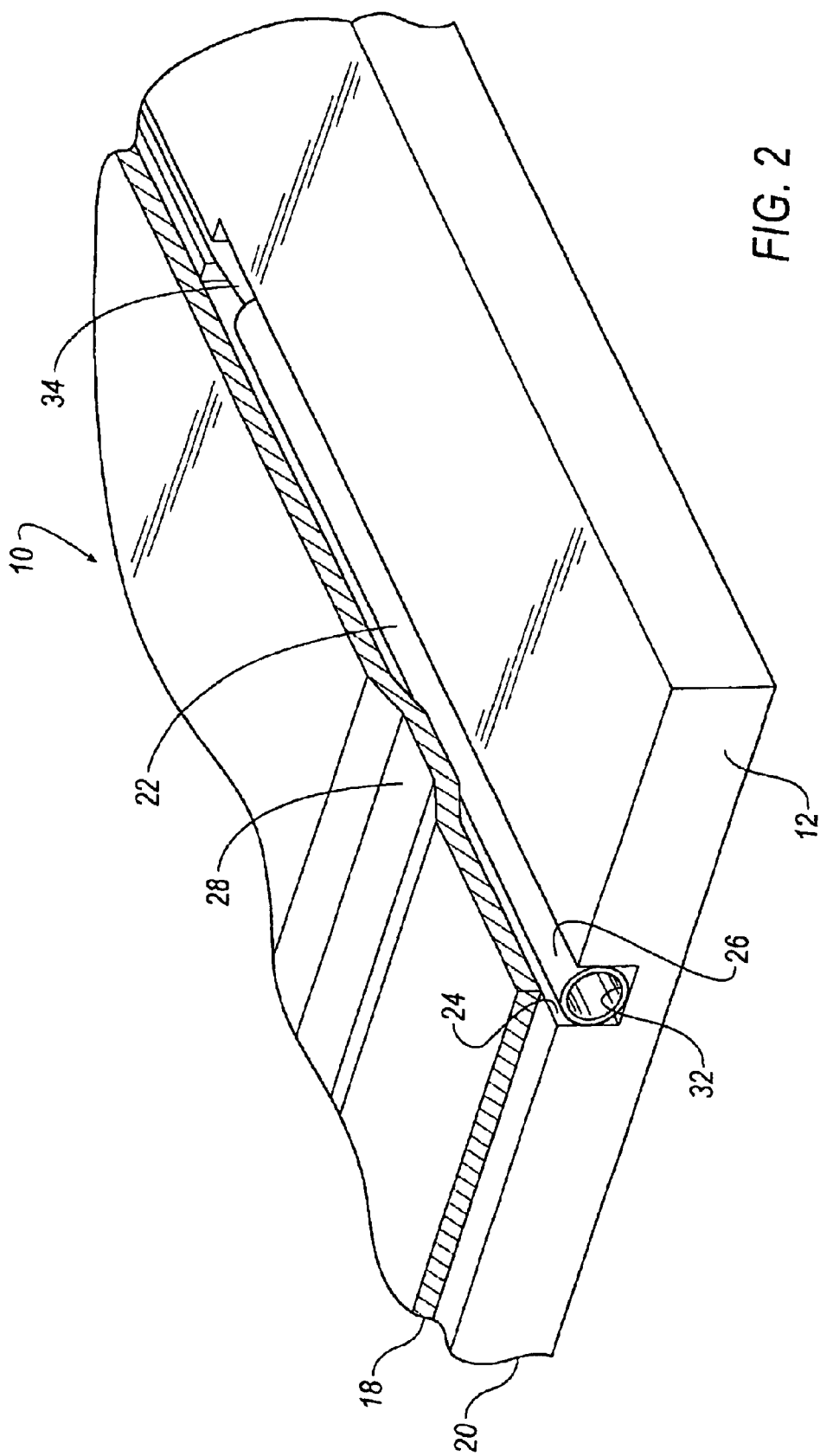
FIG. 2 is an enlarged perspective break-away view of a portion of the gasket of the present invention to reveal details of a groove provided in the surface of an MLS cylinder head gasket spacer layer, showing the protective metal tube positioned in the groove, wherein the top layer of the gasket has been cut back to reveal the tube.

Referring now also to FIG. 2, the MLS gasket 10 includes at least a pair of layers 18 and 20. The top layer 18 is a beaded active layer containing a metal bead 28, as will be appreciated by those skilled in the art. Typically, the layer 18 has a counterpart mirror image layer (not shown) that defines a bottom layer, i.e. one positioned beneath the layer 20, wherein the layer 20 acts as a non-beaded, non-active, spacer layer.

A protective metal tube 22 lies in a groove 24 of the spacer layer 20 in a manner such that the groove 24 completely encases the metal tube 22, as shown. Alternatively, the grove 24 can be formed in both the spacer layer 20 as well as in the upper layer 18. An end 26 of the tube 22 is positioned near the boundary of the combustion aperture 12. To the extent that only one end 30 of an elongated gasket 10 is depicted (FIG. 1), references to apertures 12 will be understood to extend beyond the single combustion aperture 12 depicted in FIG. 1.

Figure 3:
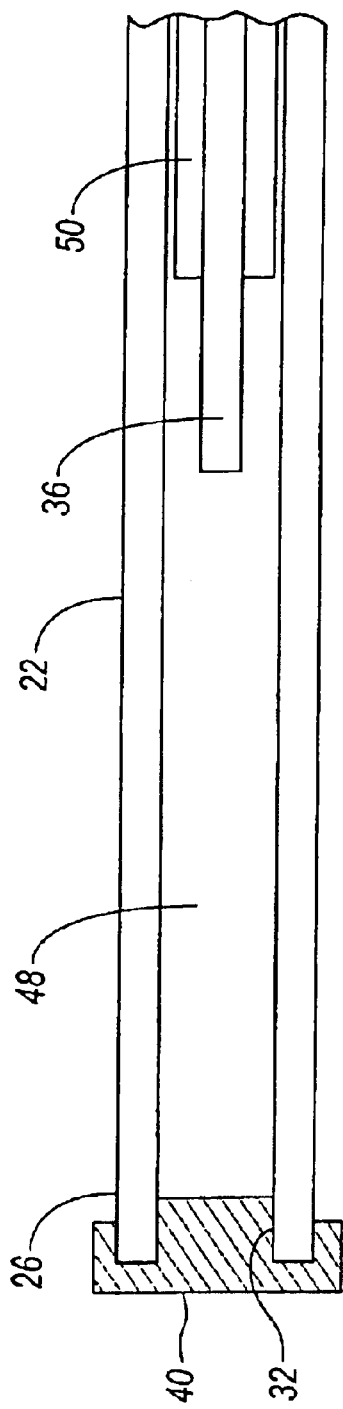
FIG. 3 is a cross-sectional view of a portion of the protective tube, shown separately and apart from the gasket, displaying the end of the tube adapted to be positioned nearest the engine combustion aperture, corresponding to the view of FIG. 2.
Figure 4:
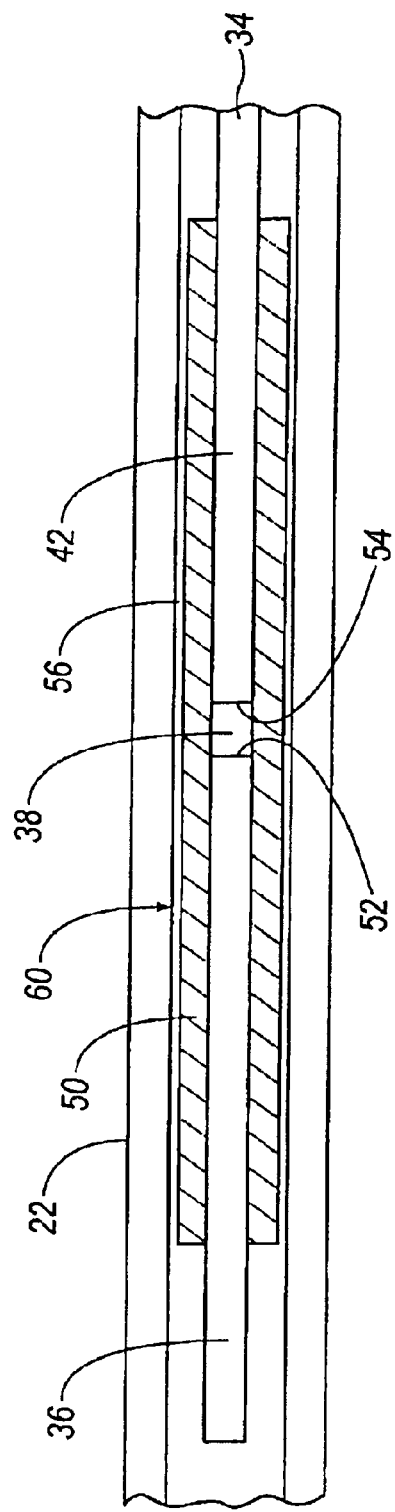
FIG. 4 is a cross-sectional view of an intermediate portion of the protective tube, also shown separately and apart from the gasket, displaying the pressure sensor apparatus contained within the metal tube.
Figure 5:
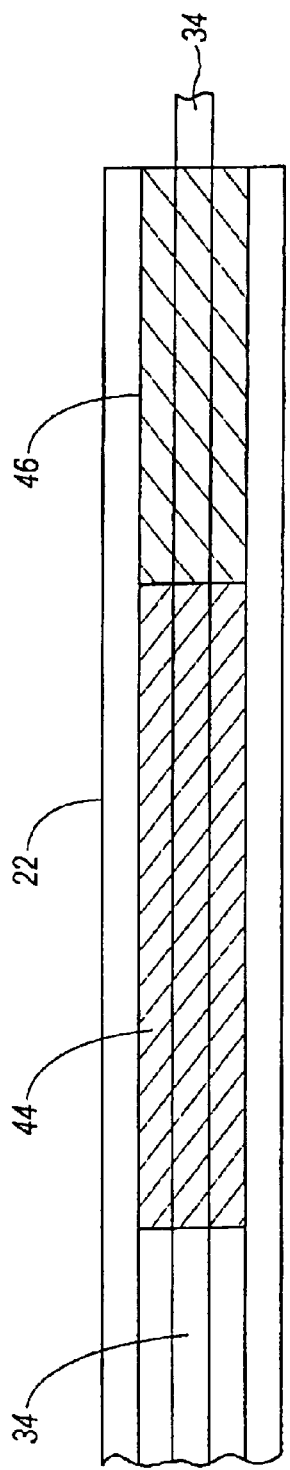
FIG. 5 is a cross-sectional view of an end of the protective tube opposite the end positioned near the engine combustion aperture, displaying features related to the protection of the sensor mechanism.
Figure 6:
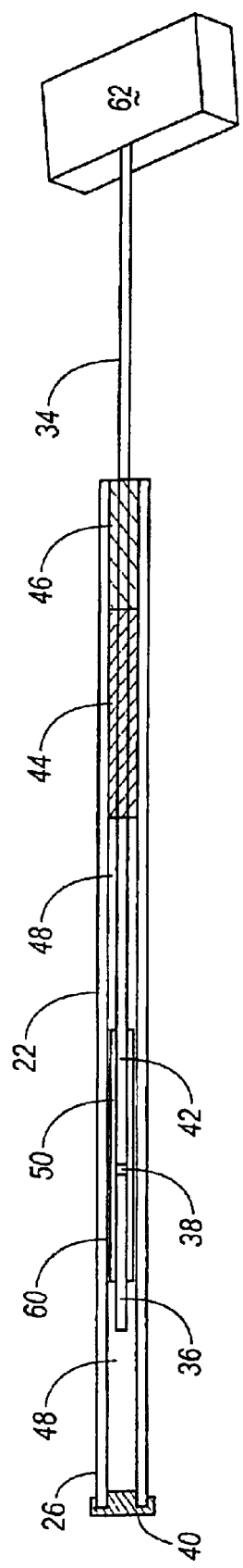
FIG. 6 is a cross-sectional view of the entire length of the protective metal tube, including all sections of the tube as displayed in FIGS. 3, 4, and 5.

Referring now to FIGS. 3, 4, 5, and 6, the pressure sensor apparatus 60 may specifically be described. Each of the FIGS. 3, 4, and 5, displays only a partial section of the tube 22, while FIG. 6 shows the entire length of the protective metal tube 22. It will be apparent that the combustion boundary end 26 of the metal tube 22, shown in most detail in FIG. 3, is the end protruding toward the combustion aperture 12 in FIG. 2. On the other hand, an incoming fiber optic cable wire 34 is shown at the extreme opposite end of the tube 22 in FIG. 5. Intermediately positioned between noted ends of the tube 22, FIG. 4 provides a detailed view of the sensor apparatus 60 that consists primarily of a silica tube 50 which houses a strand of reflective fiber optic cable wire 36, spaced by a gap 38 from a reflective end 42 of the incoming fiber optic cable wire 34. The cable wire strand 36 and the reflective end 42 are fused via high temperatures to the internal diameter of the silica tube 50 so as to fix the gap 38. The respective spaced parallel ends 52 and 54 of the latter members are squared with respect to one another, as shown, so as to enable changes in intensity of light emitted through the incoming cable wire 34 to be measured with great accuracy.

Referring specifically now to FIG. 3, an interior bore 32 of the combustion end 26 of the tube 22 is adapted for receiving a metallic pressure diaphragm 40 by which combustion pressure may be received and transmitted through a fluid medium, such as a column of oil 48, to the sensor apparatus 60. In the described embodiment, the diaphragm is manufactured of nickel alloy metal to provide appropriate characteristics of heat resistance and pressure transmission for the intended environment. Due to the miniature size of the pressure diaphragm 40, the diaphragm is also referred to as a micro-bellows mechanism.

Referring now to FIG. 5, it will be noted that downstream of the sensor apparatus 60 is positioned a so-called wick stop material 44 installed during manufacture to arrest wicking of any high temperature adhesive material 46 into the oil entrained portion of the tube 22. Thus referring specifically to FIG. 6, it will be noted that the oil-entrained columns 48 are both upstream and downstream of the sensor apparatus 60. Those skilled in the art will appreciate that the high temperature oil 48 must be of a type not subject to significant thermal expansion. One such as choice is a so-called diffusion pump type of oil. Another is a silicone brake fluid such as that used in automotive brake systems, and subject to temperatures of up to at least 400 degrees Fahrenheit. The wick stop material 44 in the described embodiment is of a high temperature RTV elastomer, and is used because the high temperature adhesive material 46 is applied in a fluid state during the manufacturing process.

Referring now to FIGS. 4 and 6, it will be appreciated that the sensor apparatus 60 incorporates a silica tube 50 that floats in the oil column 48 within an intermediate portion of the tube 22. In the described embodiment, there is no adhesion or attachment in the interface 56 (FIG. 4) between the silica tube 50 and the metal protective tube 22. The metal protective tube 22 is thus free to expand and contract in the engine environment relative to the apparatus 60.

Finally, those skilled in the art will appreciate that the optical signals generated by means of the sensor apparatus 60 are created by virtue of fluctuating changes in the gap 38 caused by responses of the pressure diaphragm 40 to combustion activity occurring within the cylinders 12. As appreciated by one skilled in the art, changes in pressure adjust the overall axial length of the silica tube 50, thereby changing the distance of the gap 38 between the cable wire strand 36 and the reflective end 42 of the incoming fiber optic cable wire 34. Such signals must ultimately however be converted into electrical signals for the purposes of being read appropriately by an engine control module 62 (FIG. 6) for providing real-time engine management, including optimization of fuel economy and emissions levels.

It is to be understood that the above description is intended to be illustrative and not limiting. Many embodiments will be apparent to those of skill in the art upon reading the above description. For example, a gasket within the sensor elements and wires molded into the body of the gasket material would fall within the broader scope of this invention. Therefore, the scope of the invention should be determined, not with reference to the above description, but instead with reference to the appended claims, along with the full scope of equivalents to which such claims are entitled.

What is claimed is:

1. A combustion pressure sensor in a cylinder head gasket adapted for use in an internal combustion engine, the gasket defining a least one combustion cylinder bore aperture, the sensor adapted for placement at a boundary of the bore aperture; wherein the sensor is adapted to measure combustion pressure changes within a cylinder bore of the engine for determining engine conditions including predetonation, said sensor comprising a metal tube positioned at the boundary of the bore aperture, a membrane fixed to one end of said metal tube proximal to said aperture boundary, and a sensor apparatus affixed to an optical wire extending into the other end of said tube, wherein said wire is adapted for conveying optical signals initially generated by said membrane as pressure pulses, wherein said optical signals are generated by said sensor apparatus in response to pressure-induced movements of said membrane, and whereby variations in the intensity of said optical signals correspond to variations of combustion pressures as reflected by said movements of said membrane.

2. The combustion pressure sensor of claim 1, wherein said metal tube comprises an apparatus for housing and protecting the sensor apparatus and optical wire from damage by crushing forces due to sealing stresses at the cylinder bore.

3. The combustion pressure sensor of claim 2, wherein the gasket comprises an MLS gasket including exterior layers and at least one intermediate spacer layer situated between said exterior layers, wherein said spacer layer defines at least one groove formed thereinto for accommodating placement of said sensor apparatus and sensor wire.

4. The combustion pressure sensor of claim 3, wherein said tube comprises an end positioned near a boundary of the cylinder bore, and wherein said metal tube further comprises a fluid-filled tube; said membrane fixed at one end of said tube near said boundary for keeping combustion gases out of said tube, and for retaining said fluid within said tube.

5. The combustion pressure sensor of claim 4, wherein said sensor further comprises an incoming cable and a reflector cable strand having an end spaced from an end of said incoming cable, a silica tube contained within said metal tube, said silica tube in turn containing said spaced incoming cable and reflector cable strand, to hold said members in spaced condition to define a gap between ends of said members.

6. The combustion pressure sensor of claim 5, wherein said pressure sensor comprises a knock detection sensor.

7. The combustion pressure sensor of claim 6, wherein said sensor apparatus comprises a system for detecting combustion parameters, wherein sensing is provided at the cylinder bore for transmittal of cylinder-specific pressure data to real-time engine management system for optimization of engine performance parameters.

8. The combustion pressure sensor of claim 1, further comprising an optical cable wire integrally attached to the engine management system for accommodating transmittal of said cylinder-specific pressure data to said real-time engine management system.

9. The combustion pressure sensor of claim 8, wherein said gasket comprises at least one beaded layer and one flat spacer layer, wherein each of said layers comprises at least one port aperture, and wherein said apertures are concentrically registered with each other in said respective layers, and wherein said spacer layer comprises a surface groove adapted to receive both said pressure sensor apparatus and said sensor cable wire in communication therewith.

10. The combustion pressure sensor of claim 9, further comprising a plurality of said sensors, each protected in a metal body, and wherein surface grooves positioned in said layers each comprise a surface depth at least equal to the outside dimension of said metal body, such that each sensor may be substantially received within each of said grooves.

11. The combustion pressure sensor of claim 10, wherein said fluid is oil.

12. The combustion pressure sensor of claim 11, wherein said tube comprises a wick stop material positioned downstream of said sensor apparatus.

* * * * *

UNITED STATES PATENT AND TRADEMARK OFFICE
CERTIFICATE OF CORRECTION

PATENT NO. : 6,701,775 B1
DATED : March 9, 2004
INVENTOR(S) : Frank W. Popielas et al.

It is certified that error appears in the above-identified patent and that said Letters Patent is hereby corrected as shown below:

Column 4,
Line 54, please change "a" to -- at --.

Column 6,
Line 5, please change "1" to -- 7 --.

Signed and Sealed this

Twenty-ninth Day of June, 2004

JON W. DUDAS
*Acting Director of the United States Patent and Trademark Office*